(12) United States Patent
Backs

(10) Patent No.: US 6,719,360 B1
(45) Date of Patent: Apr. 13, 2004

(54) TRAILER BODY CONSTRUCTION

(75) Inventor: Jason Backs, Houston, TX (US)

(73) Assignee: Travis Body & Trailer, Inc., Houston, TX (US)

( * ) Notice: Subject to any disclaimer, the term of this patent is extended or adjusted under 35 U.S.C. 154(b) by 0 days.

(21) Appl. No.: 10/267,089

(22) Filed: Oct. 9, 2002

(51) Int. Cl.[7] ............................................. B62D 33/023
(52) U.S. Cl. ....................... 296/181; 296/191; 52/588.1
(58) Field of Search ................................. 296/181, 182, 296/183, 184, 191; 52/519, 588.1; 280/433

(56) References Cited

U.S. PATENT DOCUMENTS

| | | | | |
|---|---|---|---|---|
| 4,420,183 A | * | 12/1983 | Sherman | 296/181 |
| 5,052,741 A | * | 10/1991 | Brown et al. | 296/191 |
| 5,791,726 A | * | 8/1998 | Kaufman | 296/181 |
| 5,860,693 A | * | 1/1999 | Ehrlich | 296/191 |
| 6,349,988 B1 | * | 2/2002 | Foster et al. | 296/181 |
| 6,425,626 B1 | * | 7/2002 | Kloepfer | 296/181 |
| 2002/0041112 A1 | * | 4/2002 | Foster et al. | 296/187 |
| 2002/0190540 A1 | * | 12/2002 | Kloepfer | 296/181 |
| 2003/0011211 A1 | * | 1/2003 | Booher | 296/181 |

* cited by examiner

*Primary Examiner*—D. Glenn Dayoan
*Assistant Examiner*—Patricia L. Engle
(74) *Attorney, Agent, or Firm*—Lieberman & Brandsdorfer, LLC

(57) ABSTRACT

A trailer body employs hollow and generally rectangular dual wall tubes stacked, interlocked and welded on both sides continuously to form each side of the trailer body. The extrusion walls are of varying thickness to minimize weight and maximize strength and durability.

9 Claims, 2 Drawing Sheets

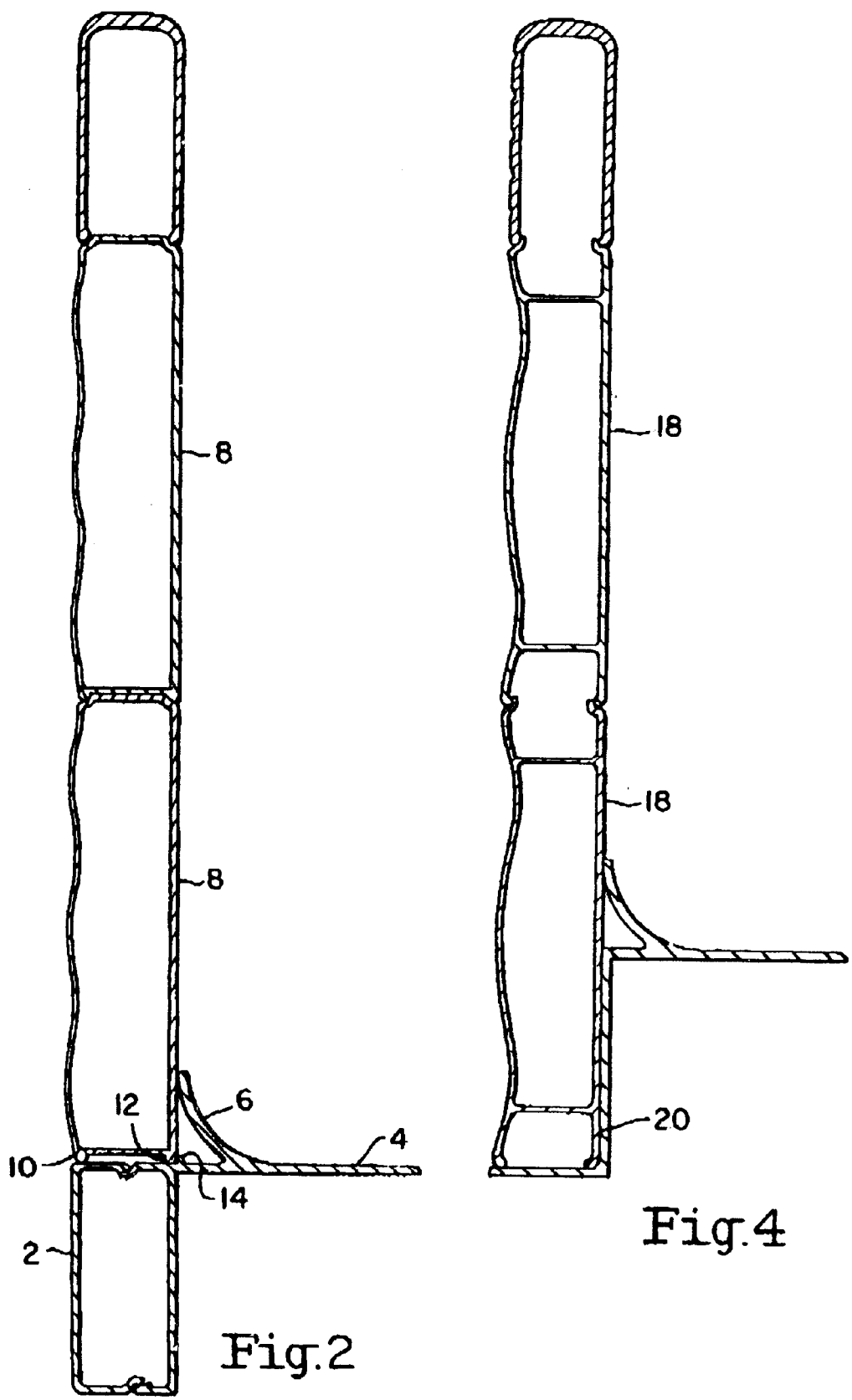

TRAILER BODY CONSTRUCTION

FIELD OF THE INVENTION

The present invention relates to trailer bodies, including end dumps (frame-less quarter-frame, frame-type), bottom dumps, dump bodies, side dumps, tippers, moving slat floor trailers, as well as many others.

The invention provides a body construction permitting an increase in strength of the body without a significant increase in weight. The invention further provides for a sidewall configuration that provides different side heights constructed by stacking generally rectangular tubes upon one another that have mating ends engaging each other to aid in fabrication. The resultant assembly has internal stiffeners to provide stiffness and rigidity, and various thicknesses of the individual tubular extrusions to maximize strength and durability. The structure also provides slightly corrugated exterior walls of the extended tubes to increase stiffness and rigidity, an internal dead air space to increase the insulating properties, a smooth aerodynamic exterior surface to reduce wind drag, improve fuel mileage, provide greater strength to allow for a thinner than conventional wall to be constructed thereby providing more internal volume for the same exterior dimensions, the ability to employ an extrusion alloy which has superior properties to available sheet and runs the full practical length of the body. The construction also provides the ability to mask the interior surface so that damage to the interior surface will not be evident from the exterior of the trailer.

The present invention relates to all forms of dump trailers, and more particularly to construction of trailer sidewalls by assembly of sidewall extrusions that are hollow and generally rectangular.

Further, the present invention relates to trailer bodies, including, for instance, end dump trailers (frame-less, quarter-frame, frame-type, bottom dumps, side dumps, tippers and moving slat floor trailers). The structure provides for different side heights effected by stacking large rectangular tubes one upon another; the tubes having mating ends that engage each one to another providing ease of fabrication. The exterior walls are slightly corrugated, also to increase stiffness and rigidity.

The invention further relates to the wall design of the load bearing regions of the trailers, and more particularly, to the design providing increased load capacity, strength of the walls, and heat insulation of the load.

Conventional design of these side walls employ solid walls with poor insulating characteristics. Also, the exterior surface of these walls show the effects of the load carried; rocks, hard metals and other hard material that bounce around during transport and loading.

The construction of the tubes can accommodate different wall thicknesses and heights, thus imparting a degree of flexibility to the overall design.

SUMMARY OF THE INVENTION

The walls in the load region of a trailer of the present invention have an exterior that is aerodynamic thereby providing increased fuel efficiency. The walls are hollow and thus do not show on the outside wall interior wall damages (dents). Further, the sidewalls of a trailer body are constructed completely of a generally rectangular hollow cross section extrusion that can be stacked one on top of another via self aligning mating ends. When assembled, and welded the tubular extrusions provide for internal stiffeners between the interior and exterior walls. The individual extrusions vary in thickness around its perimeter sc the minimum amount of material is used to produce the maximum amount of strength. The assembled side results in an inner wall exposed to the hauled material and an exterior wall which hides any damage that may occur to the inner wall. The outer wall is slightly corrugated to provide stiffness to the thin outer face. The extrusions run the full practical length of the trailer. The inner and exterior walls of the extrusion provide a dead air space providing positive insulative properties. The assembled sidewall results in a smooth and aerodynamic exterior surface. The structural properties of the sidewall allow the overall width of the wall to decrease relative to prior construction providing an increase in interior volume. The material the extrusions usually employ has superior strength and abrasion resistance over standard sheet. The use of a metal tougher than that of prior designs, together with the insulating characteristics of a thinner hollow wall, greatly increase the load to weight ratio of the trailer's capacity.

In a typical example, the walls have 2¼" wide and full length webs each 12" apart to provide construction of great strength. The outer skin of the walls have a wave design to increase strength, but are essentially smooth and may carry advertising and/or other displays.

These basic changes to the body construction are accomplished with little or no increase in weight, but provide a great increase in the strength, durability, functional use, ease of manufacture, and aesthetic appeal.

The construction set forth in the invention relates to trailer bodies, including end dumps (frame-less, quarter-frame, frame-type), bottom dumps, dump bodies, side dumps, tippers, moving slat floor trailers, as well as many others.

BACKGROUND OF THE INVENTION

There are numerous designs for trailer bodies that have been used for many years with only minor modifications.

The conventional sidewall is illustrated in FIG. 1 designated as prior art. This configuration employs flat sheet and several different extrusions to strengthen and brace the wall. Typically the sheet is 0.160" thick material.

The top edge of the sheet is framed generally by a top rail; an extrusion typically nine inches by four inches. The sheet is further stiffened by another extrusion, vertical and perpendicular to the toprail and spaced on generally 28" centers along the outer surface length of the side wall designated hereof as the side stake. The individual extrusions are welded to the sheet to complete the sidewall.

The prior construction illustrated in FIG. 1 has been used to make bodies ranging from 14 feet with 42 inch sides to bodies 53 feet long with 106 inch sides.

There may be patents on inventions for the basic sidewall design described above, but none that materially provide: insulating properties, improved aerodynamics, greater strength, complete use of extrusions instead of sheet, increased interior volume, and the ability to hide the damage to the interior of the side wall caused by movement of the load.

BRIEF DESCRIPTION OF THE PRESENT INVENTION

The present invention provides a trailer sidewall formed completely of extrusions of a generally rectangular cross section that can be stacked one upon another to form a progressively taller side wall from extrusions capable of being stacked one upon another.

The dual wall sidewall internal stiffeners that support the interior and exterior walls provide a rigid structure to resist failure from buckling.

The trailer sidewall is composed of extrusions generally rectangular in cross section that may have various thicknesses distributed around the perimeter of the body to maximize the sidewall's strength and ability to resist abrasion as well as minimize the weight.

The exterior walls of the tubes hide any damage to the interior wall and provide for an aesthetically clean and pleasing exterior surface thereby helping to retain the trailer's resale value. The exterior walls are slightly corrugated to provide additional stiffness throughout the relatively thin outer section.

The design of the sidewalls of the trailer body provides a dead air space between inner and outer walls, thereby providing advantageous insulating properties at relatively low cost and no significant increase in weight.

The sidewall of the trailer body is generally smooth and aerodynamic to reduce the wind drag and increase fuel mileage.

The construction of the trailer side wall attains strength sufficient to permit the overall thickness of the wall to be decreased to provide greater interior volume for a given exterior volume.

The trailer sidewall is assembled from extrusions having superior strength and abrasion resistant properties over prior art designs which employ sheet metal.

The above and other features, objects and advantages of the present invention, together with the best means contemplated by the inventor thereof for carrying out the invention still become more apparent from reading the following description of a preferred embodiment and perusing the associated drawings in which:

BRIEF DESCRIPTION OF THE DRAWINGS

FIG. 2 is a showing of a wall element employed in the present invention, in cross section;

FIG. 4 is a side view of an alternative wall element structure.

DETAILED DESCRIPTION OF THE PRESENT INVENTION

Figure 1:
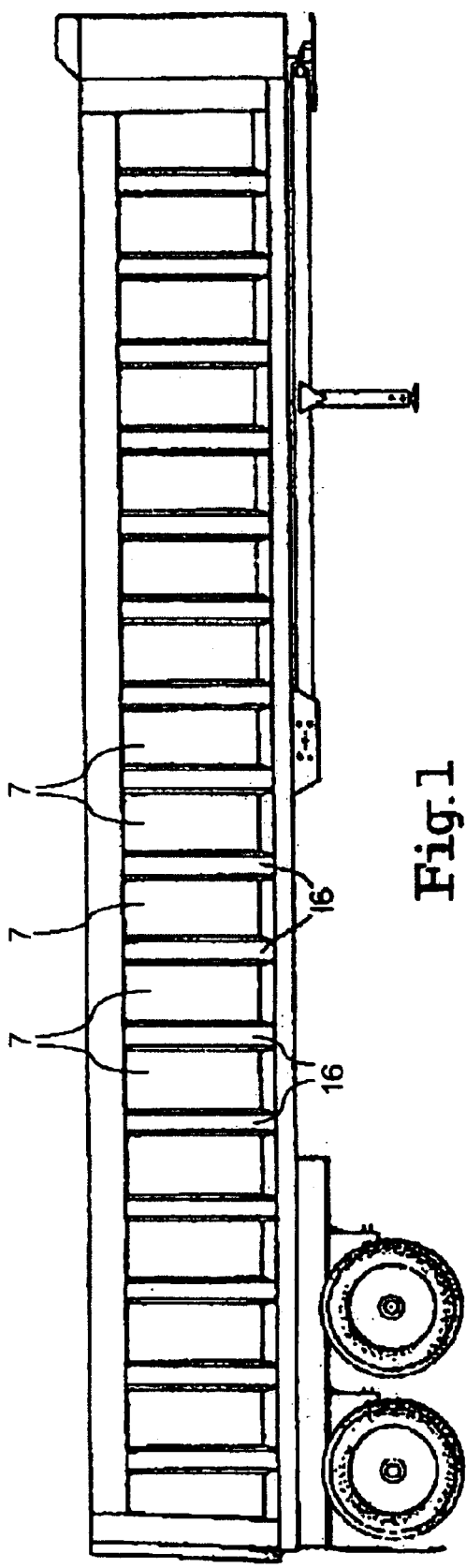
FIG. 1 is a side view of a prior art wall element employing sheet metal sides.
Figure 3:
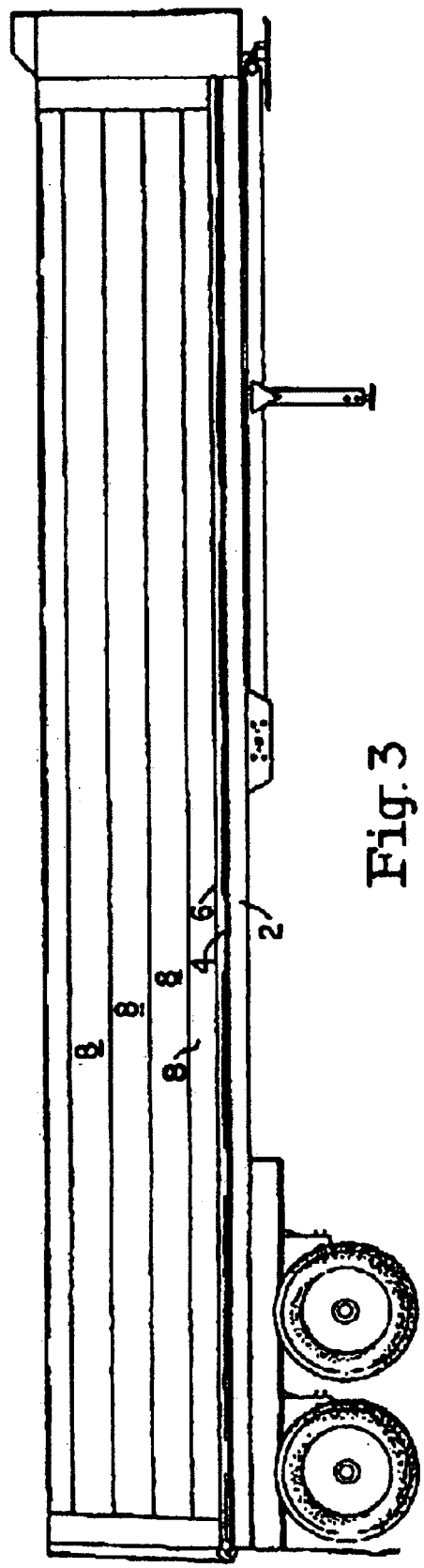
FIG. 3 is a showing of a truck body wall employing the elements of FIG. 2 of the present invention.

Referring now specifically to FIGS. 2 and 3 of the accompanying drawings, walls of the load bearing region of a truck body are shown. A lower extrusion 2, of FIG. 2, having a rectangular cross section, extends along a predetermined length of the truck body. It can extend the full length of the body or only a partial length if desired to permit different designs of panels to be used for aesthetic reasons or for different needs in different applications. A horizontal extension 4, extends from the top of the extrusion 2 and has an upwardly extending curved member 6 that presses against an extrusion seated on top of the extrusion 2.

In accordance with prior art teachings, side stakes 16 can be deployed along the outer surface of side sheet 7. Please note, side sheet 7 is vertically laid across the length of the trailer with side stakes 16 vertically laid along the outer surface of side sheet 7. These stakes add substantial strength to the sidewalls of the truck body to permit increased load carrying capacity. Also, the stakes reduce the damage done to the sidewalls by the shifting of the load.

The extrusion 8 may also run the full length of the body or partial length as appropriate to needs. The bottom surface of the extrusion 8 has projections 10 and 12 along its two long bottom edges. These projections sit on the top of the extrusion 2 with projections 10 seated against an upward protrusion 14 of horizontal extension 4 to effect positive positioning. Horizontal extensions 2 and 4 together with elements 6 and 14 are collectively known as a rubrail, an industry standard term. The projection 10 of member 8 is positively positioned against protrusion 14 so that the extrusion 8 is, in effect, initially aligned against elements 6 and 14.

As shown in FIG. 2, the panel member 8 has an interior wall 22 and an exterior wall 26. The interior wall has a thickness shown at 24, and the exterior wall has a thickness shown at 28. The thickness of the interior wall portion of the panel 8 is greater than the thickness of the exterior wall portion of the panel 8. In addition, as shown in FIG. 2, the interior wall 22 of the panel 8 is vertical without any indentations or corrugations, wherein the exterior wall 26 of the panel 8 has corrugations along the length. The greater thickness of the interior wall provides greater strength. However, the reduced thickness of the exterior wall saves weight, while the corrugations provide enchanced strength that overcomes the reduced thickness of the exterior wall. Finally, the difference in the thickness of the interior and exterior walls 22 and 26, respectively, of the panel 8 provide a perimeter with a varied thickness. Accordingly, the varied thickness of the walls of the panel 8 provide enhanced structural integrity while reducing the weight associated with the panel.

All junctions of the various elements of the assembly are welded, the elements such as 6, 10, and 14 being employed to provide proper positive positioning and stability of the various elements prior to welding. These elements also help to import long term stability to the structure.

Referring now to FIG. 4 of the accompanying drawings, there is illustrated an alternative form of the elements of FIG. 2.

Element 18 of FIG. 4 (element 8 of FIG. 2) is extended downward into the member 20 and is now element 18. The member 2 of FIG. 2 is now designated as element 20.

The advantage of this construction is that it ties elements 18 and 20 together more securely than the structure of FIG. 2. Also, the junction of elements 18 and 20 insures that the element 18 is tied into the base of the structure as is the case in FIG. 2.

The alternative design illustrated in FIG. 4 was developed initially because of the very high molding pressure required by the original equipment. The pressure in use was sufficiently high to occasionally break the mold. The design of FIG. 4 required less molding pressure, and was not initially employed because of reproduction problems. Specifically, the lower pressure employed did not always insure a proper reproduction of the mold and the higher pressure system was preferred in spite of the broken mold problems.

The molder acquired more sophisticated molding equipment and the problem of broken molds was eliminated. The alternative design of equipment of FIG. 4 is on standby for use when the original equipment requires repair or cleaning.

In use the aluminum is heated to within approximately thirty degrees of its melting temperature and then pushed through the dye.

Once given the above disclosure, many other features, modifications and improvements will become apparent to the skilled artisan. Such features, modifications and improvements are, therefore, considered to be a part of this invention, the scope of which is to be determined by the following claims.

What is claimed is:

1. A trailer vehicle comprising:

a horizontal platform;

a lower extrusion panel positioned horizontally adjacent to said platform;

a hollow extruded wall panel positioned horizontally adjacent to said lower extrusion panel; and said hollow extruded wall panel having a corrugated exterior surface with a thickness, and an interior wall surface with a thickness greater than said exterior surface thickness.

2. The trailer vehicle of claim 1, further comprising a rubrail having a curved member adapted to extend from a top surface of said lower extrusion panel to contact an adjacent hollow extruded panel along an interior surface thereof, wherein a point of contact of said curved member with said interior surface of said hollow panel is between a top and bottom surface of said panel.

3. The trailer vehicle of claim 1, further comprising a set of vertical projections on a bottom wall of said hollow extruded wall panel.

4. The trailer vehicle of claim 3, further comprising an upward protrusion on a top wall of said hollow extruded wall panel.

5. The trailer vehicle of claim 4, wherein a mate of said vertical projections with said upward protrusion provide positional placement of panels.

6. The trailer vehicle of claim 1, wherein said hollow wall panel has a cross section with a non-uniform thickness extending along the height of the panel.

7. The trailer vehicle of claim 6, wherein said wall panel thickness is distributed around a perimeter of said panel.

8. The trailer vehicle of claim 1, wherein said wall is adapted to extend a length of said vehicle, wherein said length is selected from a group consisting of: a full length of said vehicle, and a partial length of said vehicle.

9. The trailer vehicle of claim 1, further comprising said hollow extruded wall panel having a perimeter with a variable thickness.

* * * * *